US008852544B2

(12) United States Patent
Auger et al.

(10) Patent No.: US 8,852,544 B2
(45) Date of Patent: Oct. 7, 2014

(54) PROCESS FOR PREPARING POROUS SILICA PARTICLES, SAID PARTICLES AND USES THEREOF

(75) Inventors: Aurélien Auger, Le Mans (FR); Olivier Poncelet, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 1023 days.

(21) Appl. No.: 12/712,228

(22) Filed: Feb. 25, 2010

(65) Prior Publication Data

US 2010/0221542 A1 Sep. 2, 2010

(30) Foreign Application Priority Data

Feb. 27, 2009 (FR) ..................................... 09 51239

(51) Int. Cl.
C01B 33/12 (2006.01)
C01B 33/146 (2006.01)
C01B 33/145 (2006.01)

(52) U.S. Cl.
CPC ............. C01B 33/126 (2013.01); C01B 33/146 (2013.01); C01B 33/145 (2013.01)
USPC ....................................................... 423/335

(58) Field of Classification Search
CPC .... C01B 33/145; C01B 33/146; C01B 33/12; C01B 33/126
USPC ......................................... 423/335, 338, 339
See application file for complete search history.

(56) References Cited

U.S. PATENT DOCUMENTS

| | | | | |
|---|---|---|---|---|
| 5,238,671 A | * | 8/1993 | Matson et al. ................. | 423/397 |
| 5,525,377 A | * | 6/1996 | Gallagher et al. ............ | 427/512 |
| 5,760,017 A | | 6/1998 | Djedaini-Pilard et al. | |
| 5,951,962 A | * | 9/1999 | Muller et al. .................. | 423/702 |
| 6,036,886 A | * | 3/2000 | Chhabra et al. ........ | 252/301.4 R |
| 6,632,748 B2 | | 10/2003 | Yim et al. | |
| 6,696,258 B1 | * | 2/2004 | Wei et al. ........................ | 435/7.2 |
| 6,899,857 B2 | * | 5/2005 | Pheng et al. ................... | 423/338 |
| 7,405,002 B2 | * | 7/2008 | Ying et al. ..................... | 428/404 |
| 8,003,567 B2 | * | 8/2011 | Brooks et al. ................. | 502/439 |

OTHER PUBLICATIONS

Ganguli et al., "Highly Uniform Nano and Mesostructures of Silica Obtained by Reverse Micellar and Hydrothermal Methods," J Clust Sci (2009) 20:417-427 =, published online Apr. 14, 2009.*
Aditya et al., "Preparation of Silica Nanoparticles Using Microemulsion Techniques," Department of Chemical Engineering, National Institute of Technology, Rourkela 2008.*
Cho et al., Ordered hierarchical silica hybrid nanostructure with dual porosity derived from porogen-grafted silica precursors, Poly 214, Nano-structured Polymers, Division of Chemistry, The 231$^{st}$ ACS National Meeting, Atlanta, GA, Mar. 26-30, 2006.
Kwon et al., Long acting porous microparticle for pulmonary protein delivery, International Journal of Pharmaceutics 333 (2007), pp. 5-9.
Li et al., Ultra-Low-*k* Pure-Silica Zeolite MFI Films Using Cyclodextrin as Porogen, Advanced Materials, Sep. 16, 2003, vol. No. 15, Issue No. 18, pp. 1528-1531.
Lim et al., Synthesis of Ordered Microporous Silicates with Organosulfur Surface Groups and Their Applications as Solid Acid Catalysts, Chemistry of Materials, 1998, vol. No. 10, pp. 467-470.
Sabadini et al., Solubility of cyclomaltooligosaccharides (cyclodextrins) in $H_2O$ and $D_2O$: a comparative study, Carbohydrate Research 341 (2006), pp. 270-274.
Vacassy et al., Synthesis of Microporous Silica Spheres, Journal of Colloid and Interface Science 227 (2000), pp. 302-315.
Yi et al., Nanoparticle Architectures Templated by $SiO_2/Fe_2O_3$ Nancomposites, Chemistry of Materials, 2006, vol. No. 8, pp. 614-619.

* cited by examiner

*Primary Examiner* — Anthony J Zimmer
(74) *Attorney, Agent, or Firm* — Miles & Stockbridge P.C.

(57) ABSTRACT

The present invention relates to a process for preparing a porous silica particle comprising a step that consists in preparing a silica particle comprising a water-soluble pore-forming agent then in removing said pore-forming agent by dissolution. It also relates to the porous silica particles capable of being prepared by this process and to their various uses and applications.

8 Claims, 3 Drawing Sheets

PROCESS FOR PREPARING POROUS SILICA PARTICLES, SAID PARTICLES AND USES THEREOF

TECHNICAL FIELD

The present invention relates to the field of silica particles and especially of spherical and porous silica nanoparticles.

Specifically, one subject of the present invention is a process for preparing porous silica particles that involves the use of a water-soluble pore-forming agent such as a cyclodextrin derivative or a saccharide. It also relates to the porous silica particles capable of being prepared by this process and to their various uses and applications.

PRIOR ART

Spherical and porous nanoparticles are well known from the prior art. A regular porosity may be generated in a silica-based material by a conventional sol-gel process. However, a low mechanical strength, a low thermal conductivity and the hydrophobicity are significant concerns since these materials are of amorphous nature.

Recently, several methods have been established in order to produce a porous material of nanoscale size having a regular and porous structure.

One of these methods is the use of pore-forming agents which are calcined so as to obtain pores of various sizes. That said, this method requires a robust material with a view to the optimal temperature to be achieved in order to create the porosity, a temperature that is generally greater than 500° C. Various applications of the calcination method have been reported in the literature, in order to produce a nanoscale porosity in various particles such as aluminosilicates, cerium oxides, silica beads, titanium oxides. Regarding silica beads, the article by Vacassy et al. (2000) proposes using, as a pore-forming agent, either 3-aminopropyltriethoxysilane which is a trialkoxysilane having a non-hydrolysable amine functional group, or glycerol. The latter pore-forming agent gives the best results in terms of particle size distribution and morphology. However, the particles obtained have a size of greater than 150 nm [1].

Moreover, mesoporous silica particles containing platinum have been produced, by using a platinum precursor as a pore-forming agent, and by requiring a calcination in order to produce the required porosity. The preparation of porous microstructures using silica-based pore-forming agents has also been described.

The article by Yi et al. (2006) proposes preparing various types of nanoparticles from nanoparticles having a $Fe_2O_3$ core and a $SiO_2$ shell (denoted hereinbelow as $Fe_2O_3/SiO_2$ nanoparticles), said shell having been synthesized by reverse microemulsion [2]. Thus, mesoporous $Fe_2O_3/SiO_2$ nanoparticles are obtained, when the reverse microemulsion uses tetraethylorthosilicate (TEOS) and a subsequently calcined pore-forming agent, octadecyltrimethoxysilane (C18TMS). As a variant, hollow $SiO_2$ nanoparticles are obtained by etching the metal core of the $Fe_2O_3/SiO_2$ nanoparticles. Another method of introducing porosity reported in the literature therefore consists of the etching of nanoparticles.

The porosity may also be formed owing to the use of a surfactant. This has especially been used to form mesoporous silicate particles using cetyltri-methoxyammonium bromide (CTAB) as a surfactant then by extracting it from the particles formed via acid washes [3].

Ordered nanostructures of hybrid silica were established with a porosity induced by the use of thermal pore-forming agents and especially thermal pore-forming agents of adamantane type, grafted to silica precursors [4].

There is therefore a real need for a process for preparing porous silica particles that is easy to implement and does not involve harsh treatment steps such as calcination, etching, corrosion or acid treatment.

Cyclodextrins have already been reported as pore-forming agents. As a reminder, cyclodextrins are composed of cyclic oligosaccharides and are capable of forming complexes with hydrophobic molecules. This results in a large number of applications in various fields such as the transport of active agents, pharmaceutical formulation, environmental protection, supramolecular chemistry, the diffusion of fragrances and, in the food industry, for the preparation of cholesterol-free products. Specifically, lipophilic pharmaceutical products having a size compatible with the hydrophobic core of a cyclodextrin such as β-cyclodextrin having an internal diameter and therefore an internal cavity of around 7.5 Å may form complexes, resulting in an increase of the aqueous solubility of these pharmaceutical products. The in vivo effectiveness is generally maintained when these pharmaceutical products are administered as cyclodextrin complexes. Furthermore, it is important to mention that cyclodextrins are non-toxic, do not denature proteins and do not interfere with enzyme reactions.

Regarding the use of cyclodextrins as pore-forming agents, U.S. Pat. No. 6,632,748 describes the preparation of substances with nanopores having a diameter of less than 50 Å such as thin and insulating films. This preparation uses silica-based matrix precursors and cyclodextrins as pore-forming agents and a step of pyrolysis of this pore-forming agent [5].

Similarly, γ-cyclodextrins have been used in order to create porosity in silica/zeolite MFI films, the process used during the preparation of these films including a calcination step [6]. The preparation of porous microparticles of poly(lactide-co-glycolide) having a size greater than 1 μm through the use of β-cyclodextrins is also reported [7].

However, cyclodextrins have never been used as pore-forming agents for the preparation of porous silica particles.

SUMMARY OF THE INVENTION

The present invention makes it possible to overcome the drawbacks and technical problems listed above. Specifically, the latter proposes a process for preparing porous silica particles by using a particular family of pore-forming agents i.e. water-soluble pore-forming agents, the removal of which, which is essential for obtaining porosity, does not require harsh processes such as calcination, etching, corrosion or acid treatment. Considering the natural hydrophilicity of the pore-forming agents used such as β-cyclodextrin or sucrose, the latter can easily be removed by processes that are considered to be mild and not very energy intensive such as dialysis.

The work of the inventors has shown that the use of a water-soluble pore-forming agent such as β-cyclodextrin or sucrose makes it possible to generate a homogeneous porosity in the silica particles and to introduce a nanoscale regular porosity into silica-based spherical particulate materials and especially nanoparticulate materials, the size of which is advantageously less than 100 nm. Specifically, the removal of the hydrophilically labile pore-forming agent creates ordered and uniform pores having, advantageously, diameters of less than 10 Å.

Another feature of the present invention relates to the increase of the specific surface area of the silica particles, which phenomenon is due to the efficient removal of the pore-forming agent, creating cavities capable of trapping a larger number of target molecules such as those listed below.

Furthermore, in the context of the present invention, the surface area of the silica particles obtained by the process according to the invention can be functionalized thus making it possible not only to obtain a porous material (having cavities), but also one that is susceptible to and better performing in the complexing of metal ions for example. Specifically, the surface area and the pores may be functionalized, using silica precursors functionalized by silane $NH_2$ (aminopropyltri-ethoxysilane or APTES), SH (mercaptotri-ethoxysilane), EDTA, etc. coupling agents so as to be able to improve the ability of these particles to trap target elements. Furthermore, this functionalization may determine the desired influence on the polarity of the material, and thus its influence on the affinity with the solvent to be used in the case of the application, that is to say, polar, apolar, etc. and therefore of the dispersion desired.

Thus, the present invention relates to a process for preparing a porous silica particle comprising the steps consisting in:
  preparing a silica particle comprising a water-soluble pore-forming agent; then
  removing said pore-forming agent by dissolution.

In the context of the present invention, the silica particle comprising said water-soluble pore-forming agent is prepared from a reverse microemulsion.

The expression "reverse microemulsion", also known as "water-in-oil" microemulsion, is understood to mean a clear, thermodynamically stable suspension of fine droplets of a first polar liquid in a second liquid that is non-polar and therefore immiscible with the first liquid.

More particularly, the process according to the invention comprises the following steps:
  a) preparing a microemulsion ($M_a$) of the water-in-oil type containing said water-soluble pore-forming agent;
  b) adding, to the microemulsion ($M_a$) prepared in step (a), a compound that enables the hydrolysis of a silane-based compound;
  c) adding, to the microemulsion ($M_b$) obtained in step (b), at least one silane-based compound;
  d) adding, to the microemulsion ($M_c$) obtained in step (c), a solvent that makes it possible to destabilize said microemulsion;
  e) recovering the silica particles comprising said pore-forming agent which are precipitated during step (d); and
  f) removing, by dissolution, the water-soluble pore-forming agent from the silica particles recovered during step (e) in order to obtain porous silica particles.

The expression "porous silica particle" is understood, within the context of the present invention, to mean a silica particle that is in particular spherical and that has ordered and uniform pores having, preferably, diameters of less than 10 Å. Advantageously, the silica particles according to the invention have an average size of less than or equal to 100 nm, especially less than or equal to 80 nm, in particular less than or equal to 60 nm and, even, of the order of 40 nm (i.e. 40±10 nm). The silica particles according to the invention may optionally be functionalized.

The expression "water-soluble pore-forming agent" is understood, within the context of the present invention, to mean a pore-forming agent that is miscible with an aqueous solution and of which only a very small amount can be extracted from said aqueous solution into a non-polar organic solvent such as toluene or heptane.

The expression "very small amount" is understood to mean an amount of less than 5%, especially less than 3% and in particular less than 1% by weight relative to the total weight of pore-forming agent present in the aqueous solution.

The water-soluble pore-forming agent used within the context of the present invention has a solubility in water, at 25° C., of greater than 10 g/l and especially greater than 15 g/l. This solubility is of the order of 18 g/l in the case of cyclodextrins [8].

Advantageously, the water-soluble pore-forming agent used within the context of the present invention is chosen from the group constituted by cyclodextrins, cyclodextrin derivatives, mono-saccharides, oligosaccharides and polysaccharides.

The term "cyclodextrins" is understood to mean compounds formed by the bonding of anhydroglucose units, joined by alpha-1,4 glycosidic bonds with n representing an integer between 5 and 12 (limits included) and especially natural cyclodextrins having 6, 7 and 8 anhydroglucose units and known as α-cyclodextrin, β-cyclodextrin and γ-cyclodextrin respectively.

The expression "cyclodextrin derivatives" is understood to mean cyclodextrins derived from cyclodextrins such as defined previously via chemical modifications and especially via substitutions. Thus, a cyclodextrin derivative may have one or more identical or different substitutions on one or more anhydroglucose units. Any substitution aims, in particular, to replace a hydroxyl group of an anhydroglucose unit with another group such as a halogen; a maltosyl; a glucosyl; a phenyl; a benzyl; a methyl; a hydroxypropyl; a naphthyl; an optionally substituted, linear or branched alkyl group having from 1 to 20 carbon atoms; an optionally substituted, linear or branched aryl group having from 1 to 20 carbon atoms advantageously from 3 to 18 carbon atoms and, particularly, from 6 to 15 carbon atoms; an optionally substituted amine group having from 1 to 20 carbon atoms; an optionally substituted amide group having from 1 to 20 carbon atoms; an optionally substituted sulphonyl group having from 1 to 20 carbon atoms; an optionally substituted sulphoxide group having from 1 to 20 carbon atoms; or an optionally substituted thiol group having from 1 to 20 carbon atoms. The expression "optionally substituted" is understood to mean substituted by a halogen, a hydroxyl, a naphthyl, a benzyl or an alkyl having from 1 to 6 carbon atoms.

As non-limiting examples of cyclodextrin derivatives that can be used within the context of the present invention, mention may be made of the derivatives of formula (I) described in U.S. Pat. No. 5,760,017 [9].

The monosaccharides advantageously used within the context of the present invention are monosaccharides having from 3 to 7 carbons such as glyceraldehyde, dihydroxyacetone, erythrose, threose, erythrulose, deoxyribose, ribose, arabinose, xylose, lyxose, ribulose, xylulose, allose, altrose, glucose, mannose, gulose, idose, galactose, talose, psicose, fructose, sorbose, tagatose, sedoheptulose and mannoheptulose.

The oligosaccharides and polysaccharides advantageously used within the context of the present invention are especially:
  diholosides or oligoholosides such as trehalulose, saccharose (or sucrose), turanose, leucrose, isomaltulose, melibiose, lactulose, lactose, rutinose, inulobiose, mannobiose, trehalose, maltose, isomaltose, sophorose, laminaribiose and cellobiose; and
  polyholosides, such as glycogen, it being understood that the molecular weight of the pore-forming agent should not exceed especially 15 000, in particular 10 000 and even 4000, all being soluble in water.

One pore-forming agent that is particularly suitable for the process according to the invention is the molecule of β-cyclodextrin that has the shape of a truncated cone, constituted of a hydrophobic cavity and activated hydroxyl groups. This molecule has a great affinity for water. It is known that the external surface area and also the core of silica nanoparticles have hydroxyl groups and the latter can interact with the molecules of β-cyclodextrin by forming hydrogen bridges. Thus, this phenomenon ensures a good miscibility between the molecules of β-cyclodextrin and the silica particles in suspension. By introducing molecules of β-cyclodextrin and by varying the concentration, the mesoporosity becomes controllable.

Step (a) of the process according to the invention therefore consists in preparing a microemulsion ($M_a$) of the water-in-oil type containing the water-soluble pore-forming agent. Any technique that makes it possible to prepare such a microemulsion can be used in the context of the present invention. Thus, it is possible to:
- either prepare a first microemulsion ($M_1$) of the water-in-oil type and to subsequently incorporate therein the water-soluble pore-forming agent in order to obtain the microemulsion ($M_a$);
- or prepare the microemulsion ($M_a$) directly by mixing together the various components and therefore the water-soluble pore-forming agent.

Advantageously, step (a) of the process according to the invention consists in preparing a first microemulsion ($M_1$) into which the water-soluble pore-forming agent is subsequently incorporated. This microemulsion ($M_1$) of the water-in-oil type is obtained by mixing together at least one surfactant, at least one cosurfactant and at least one non-polar or weakly polar solvent. The surfactant, the cosurfactant and the non-polar or weakly polar solvent may be mixed in one go or be added one after the other or by group. Advantageously, they are added one after the other and, in the following order, surfactant then cosurfactant then non-polar or weakly polar solvent.

The mixing is carried out with stirring using a stirrer, a magnetic stirrer bar, an ultrasonic bath or a homogenizer, and May be implemented at a temperature between 10 and 40° C., advantageously between and 30° C. and, more particularly, at ambient temperature (i.e. 23° C.±5° C.) for a duration between 1 and 45 min, especially between 5 and 30 min and, in particular, for 15 min.

The surfactant(s) that can be used within the context of the present invention aim(s) to introduce hydrophilic species into a hydrophobic environment and may be chosen from ionic surfactants, non-ionic surfactants and mixtures thereof. The term "mixtures" is understood, within the context of the present invention, to mean a mixture of at least two different ionic surfactants, a mixture of at least two different non-ionic surfactants or a mixture of at least one non-ionic surfactant and at least one ionic surfactant.

An ionic surfactant may especially be in the form of a charged hydrocarbon-based chain, the charge of which is counterbalanced by a counterion. As non-limiting examples of ionic surfactants, mention may be made of sodium bis(2-ethylhexyl)sulphosuccinate (AOT), cetyltrimethylammonium bromide (CTAB), cetylpyridinium bromide (CPB) and mixtures thereof.

A non-ionic surfactant that can be used within the context of the present invention may be chosen from the group constituted by polyethoxylated alcohols, polyethoxylated phenols, oleates, laurates and mixtures thereof. As non-limiting examples of commercial non-ionic surfactants, mention may be made of the Triton X products such as Triton X-100; the Brij products such as Brij-30; the Igepal CO products such as Igepal CO-720; the Tween products such as Tween 20 and the Span products such as Span 85.

The term "cosurfactant" is understood, within the context of the present invention, to mean an agent capable of facilitating the formation of microemulsions and stabilizing them. Advantageously, said cosurfactant is an amphiphilic compound chosen from the group constituted by a sodium alkyl sulphate having 8 to 20 carbon atoms such as SDS (for "sodium dodecyl sulphate"); an alcohol such as an isomer of propanol, of butanol, of pentanol and of hexanol; a glycol and mixtures thereof.

Any non-polar or weakly polar solvent can be used within the context of the present invention. Advantageously, said non-polar or weakly polar solvent is a non-polar or weakly polar organic solvent and, in particular, is chosen from the group constituted by n-butanol, hexanol, cyclopentane, pentane, cyclohexane, n-hexane, cycloheptane, heptane, n-octane, isooctane, hexadecane, petroleum ether, benzene, isobutylbenzene, toluene, xylene, cumenes, diethyl ether, n-butyl acetate, isopropyl myristate and mixtures thereof.

In the microemulsion ($M_1$), the surfactant is present in a proportion between 1 and 30%, especially between 5 and 25% and, in particular, between 10 and 20% by volume relative to the total volume of said microemulsion. The cosurfactant is also present, in the microemulsion ($M_1$), in a proportion between 1 and 30%, especially between 5 and 25% and, in particular, between 10 and 20% by volume relative to the total volume of said microemulsion. Thus, the non-polar or weakly polar solvent is present, in the microemulsion ($M_1$), in a proportion between 40 and 98%, especially between 50 and 90% and, in particular, between 60 and 80% by volume relative to the total volume of said microemulsion.

Once the microemulsion ($M_1$) is prepared, the water-soluble pore-forming agent as defined previously is incorporated in order to form the microemulsion ($M_a$) of the water-in-oil type.

The water-soluble pore-forming agent may be added in solid form, in liquid form or in solution in a polar solvent. Whatever the variant used, a polar solvent is added to the microemulsion after the incorporation of said water-soluble pore-forming agent into the microemulsion ($M_1$). Advantageously, the water-soluble pore-forming agent is added to the microemulsion ($M_1$) in solution in a polar solvent then polar solvent, identical to or different from the first, is again added. More particularly, the two polar solvents used are identical. The addition of the pore-forming agent and optionally polar solvent may be carried out with stirring using a stirrer, a magnetic stirrer bar, an ultrasonic bath or a homogenizer.

The term "polar solvent" is understood, within the context of the present invention, to mean a solvent chosen from the group constituted by water, deionized water or distilled water that are acidified or basic, acetic acid, hydroxylated solvents such as methanol and ethanol, liquid glycols of low molecular weight such as ethylene glycol, dimethylsulphoxide (DMSO), acetonitrile, acetone, tetrahydrofuran (THF) and mixtures thereof.

The polar solvent (polar solvent in which the pore-forming agent is in solution and/or other polar solvent subsequently added) is present, in the microemulsion ($M_a$), in a proportion between 0.5 and 20%, especially between 1 and 15% and, in particular, between 2 and 10% by volume relative to the total volume of said microemulsion. The water-soluble pore-forming agent is present in this polar solvent in an amount between 0.05 and 10%, especially between 0.1 and 5% and, in particular, between 0.2 and 1% by volume relative to the total volume of polar solvent.

Step (b) of the process according to the invention aims to make provision for the hydrolysis of a silane-based compound by adding to the microemulsion ($M_a$) a compound that enables this hydrolysis, the microemulsion ($M_b$) thus obtained being a water-in-oil microemulsion.

The expression "compound enabling the hydrolysis of the silane-based compound" is understood, within the context of the present invention, to mean a compound chosen from the group constituted by ammonia, potassium hydroxide (KOH), lithium hydroxide (LiOH) and sodium hydroxide (NaOH) and, advantageously, a solution of such a compound in a polar solvent that is identical to or different from the polar solvent used during step (a). The compound that enables the hydrolysis of the silane-based compound is, more particularly, ammonia or a solution of ammonia in a polar solvent. Specifically, ammonia acts as a reagent ($H_2O$) and as a catalyst ($NH_3$) for the hydrolysis of the silane-based compound.

The compound chosen from the group constituted by ammonia, potassium hydroxide (KOH), lithium hydroxide (LiOH) and sodium hydroxide (NaOH), in solution in the polar solvent, is present in a proportion between 5 and 50%, especially between 10 and 40% and, in particular, between 20 and 30% by volume relative to the total volume of said solution. Furthermore, said solution is present in a proportion between 0.05 and 20%, especially between 0.1 and 10% and, in particular, between 0.5 and 5% by volume relative to the total volume of the microemulsion ($M_b$).

Step (b) may be carried out while stirring using a stirrer, a magnetic stirrer bar, an ultrasonic bath or a homogenizer, and at a temperature between 10 and 40° C., advantageously between 15 and 30° C. and, more particularly, at ambient temperature (i.e. 23° C.±5° C.) for a period between 6 and 48 h, especially between 12 and 36 h and, in particular, for 24 h.

Step (c) consists in incorporating into the microemulsion ($M_b$) thus obtained a silane-based compound or several silane-based compounds, which are identical or different, which will give, via a sol-gel reaction, the silica of the silica particles according to the invention. The incorporation into the microemulsion ($M_b$) of the silane-based compound(s) in order to obtain the microemulsion ($M_c$) of the water-in-oil type is performed while stirring using a stirrer, a magnetic stirrer bar, an ultrasonic bath or a homogenizer, and may be carried out at a temperature between 10 and 40° C., advantageously between 15 and 30° C. and, more particularly, at ambient temperature (i.e. 23° C.±5° C.) for a period between 5 min and 2 h, especially between 15 min and 1 h and, in particular, for 30 min.

Advantageously, said silane-based compound(s) is (are) an alkylsilane or an alkoxysilane. More particularly, said silane-based compound(s) is (are) of general formula $SiR_1R_2R_3R_4$ in which $R_1$, $R_2$, $R_3$ and $R_4$ are, independently of one another, a hydrogen; a halogen; an amine group; an amide group; an acyl group; a vinyl group; a hydroxyl group; an epoxy group; an isocyanate group; a carboxyl group; a thiol (or mercapto) group; an acryloxy group such as a methacryloxy group; an optionally substituted, linear or branched, alkyl group having 1 to 12 carbons, especially 1 to 6 carbon atoms; an optionally substituted, linear or branched, aryl group having 4 to carbons, especially 4 to 10 carbon atoms or an alkoxy group of formula —$OR_6$ with $R_6$ representing an alkyl group as defined previously. The expression "optionally substituted" is understood, within the context of the alkyl and aryl groups of the silane-based compounds, to mean substituted by a halogen, an amine group, an amide group, an acyl group, a vinyl group, a hydroxyl group, an epoxy group, an isocyanate group, a carboxyl group, a thiol (or mercapto) group or an acryloxy group and especially a methacryloxy group.

The silane-based compound is, more particularly, chosen from tetraethoxysilane (TEOS, $Si(OC_2H_5)_4$) dimethylsilane (DMSi, Si $(CH_3)_2H_2$) phenyltriethoxysilane (PTES, $C_6H_5Si(OC_2H_5)_3$), n-octyltriethoxysilane ($CH_3(CH_2)_7Si(OC_2H_5)_3$), n-octadecyltriethoxysilane ($CH_3(CH_2)_{17}Si(OC_2H_5)_3$), dimethyldimethoxysilane (DMDMOS, $Si(CH_3)_2(OCH_3)_2$), 3-mercaptopropyltrimethoxysilane ($SH(CH_2)_3Si(OCH_3)_3$), mercaptotriethoxysilane (SH—$Si(OC_2H_5)_3$) aminopropyltriethoxysilane ($NH_2$ $(CH_2)_3Si(OC_2H_5)_3$) and mixtures thereof. More particularly, the silane-based compound is tetraethoxysilane (TEOS, $Si(OC_2H_5)_4$)

With a view to the functionalization of the surface and of the pores of the silica particles obtained according to the invention, the silane-based compound used may be a mixture containing less than 20% and especially from 5 to 15% of a prefunctionalized silane relative to the total amount of silane-based compounds. By way of example, a mixture containing TEOS and from 5 to 15% of mercaptotetraethoxysilane may be used for the preparation of porous silica particles according to the invention that are functionalized by thiol groups.

In the microemulsion ($M_c$), the silane-based compound is present in a proportion between 0.05 and 20%, especially between 0.1 and 10% and, in particular, between 0.5 and 5% by volume relative to the total volume of said microemulsion.

Step (d) of the process according to the invention aims to precipitate the silica particles by addition of a solvent which does not denature the structure of the nanoparticles but which destabilizes or denatures the microemulsion ($M_c$) obtained in step (c).

Advantageously, the solvent used is a polar solvent as defined previously. One particular polar solvent to be used during step (d) is chosen from the group constituted by ethanol, acetone and THF. Thus, added to the microemulsion ($M_c$) is a volume of solvent identical to or greater than the volume of said microemulsion, especially greater by a factor of 1.5, in particular greater by a factor of 2, and even greater by a factor of 3.

Any technique that makes it possible to recover the silica particles comprising said pore-forming agent, which are precipitated during step (d), may be used during step (e) of the process according to the invention. Advantageously, this step (e) involves one or more identical or different steps chosen from centrifugation steps, sedimentation steps and washing steps. The washing step(s) is (are) carried out in a polar solvent such as defined previously, hereinafter designed as washing solvent. When the recovery step involves several washing steps, one and the same polar solvent is used for several or even for all of the washing steps or several different polar solvents are used for each washing step. Regarding a (or several) centrifugation step(s), it (they) may be carried out by centrifuging the silica particles especially in a washing solvent at ambient temperature, at a speed between 4000 and 8000 rpm and, in particular, of the order of 6000 rpm (i.e. 6000±500 rpm) for a duration between 5 min and 2 h, especially between 10 min and 1 h and, in particular, for 15 min.

The removal of the water-soluble pore-forming agent may be carried out, especially during step (f) of the process according to the invention, by any technique known to a person skilled in the art that favours the solubilisation or dissolution of said pore-forming agent.

Advantageously, this step (f) consists in bringing the silica particles comprising a water-soluble pore-forming agent into contact with a very large volume of water. The expression "very large volume" is understood to mean a volume greater by a factor of 50, especially by a factor of 500 and, in particular, by a factor of 1000 than the volume of silica particles comprising a water-soluble pore-forming agent that are recovered after step (e) of the process according to the invention. Step (f) may be a dialysis step, the silica nanoparticles comprising a water-soluble pore-forming agent being separated from the volume of water by a cellulose membrane, of Zellu Trans® type (Roth). Alternatively, provision may be made for an ultrafiltration step instead of the dialysis step, via a polyethersulphone membrane. Step (f) may, in addition, be carried out while stirring using a stirrer, a magnetic stirrer bar, an ultrasonic bath or a homogenizer, at a temperature between 0 and 30° C., advantageously between 2 and 20° C. and, more particularly, at low temperature (i.e. 6° C.±2° C.) for a duration between 30 h and 15 days, especially between 3 days and 10 days and, in particular, for one week.

It should be pointed out that, from steps (d) and/or (e) of the process according to the invention, the water-soluble pore-forming agent may begin to be eliminated from the silica particles comprising it especially if the solvent used in this (or these) step(s) is aqueous.

The present invention also relates to the microemulsion ($M_c$) capable of being used within the context of the process according to the invention. This microemulsion of water-in-oil type comprises:
- at least one surfactant, especially as defined previously;
- at least one cosurfactant, especially as defined previously;
- at least one non-polar or weakly polar solvent, especially as defined previously;
- at least one polar solvent, especially as defined previously;
- at least one water-soluble pore-forming agent, especially as defined previously;
- at least one silane-based compound, especially as defined previously; and
- at least one compound capable of hydrolysing said silane-based compound, especially as defined previously.

Advantageously, the microemulsion of water-in-oil type that is the subject of the present invention comprises:
- at least one surfactant in an amount between 1 and 30%, especially between 5 and 25% and, in particular, between 10 and 20%;
- at least one cosurfactant in an amount between 1 and 30%, especially between 5 and 25% and, in particular, between 10 and 20%;
- at least one non-polar or weakly polar solvent in an amount between 40 and 95%, especially between 50 and 90% and, in particular, between 60 and 80%;
- at least one polar solvent in an amount between 0.5 and 20%, especially between 1 and 15% and, in particular, between 2 and 10%;
- at least one water-soluble pore-forming agent in an amount between 0.001 and 1%, especially between 0.005 and 0.1% and, in particular, between 0.001 and 0.05%;
- at least one silane-based compound in an amount between 0.05 and 20%, especially between 0.1 and 10% and, in particular, between 0.5 and 5%; and
- at least one compound capable of hydrolysing said silane-based compound in an amount between 0.01 and 5%, especially between 0.05 and 1% and, in particular, between 0.1 and 0.5%.

The present invention relates, in addition, to a porous silica particle capable of being prepared by the process of the present invention. This particle is a porous silica particle as defined previously.

The porous silica particle according to the invention has a homogeneous porosity. The pores are of the same size, this size being a function of the pore-forming agent used. Advantageously, the porous silica particle according to the invention has ordered and uniform pores having, preferably, diameters of less than 10 Å and an average size of less than or equal to 100 nm, especially less than or equal to 80 nm, in particular less than or equal to 60 nm and, even, of the order of 40 nm.

The present invention finally relates to the use of a porous silica particle according to the invention in fields such as catalysis, printing, filtration, painting, polymerization, heat exchange, materials chemistry, refining of hydrocarbons, absorbents, the food industry, the transport of active agents, biomolecules, pharmaceutical products, bioelectronic compounds and electronic, optical, semiconductor and sensor devices.

More particularly, the present invention relates to the use of a porous silica particle according to the present invention for separating, detecting, catalysing and complexing a product of interest.

The expression "product of interest" is understood, within the context of the present invention, to mean an organic or inorganic natural, artificial or synthetic product especially chosen from the group constituted by chemicals, metal ions, inorganic compounds, organic or inorganic molecules, medicaments, peptides, proteins, nucleic acids (single-strand or double-strand DNA and RNA), synthetic or natural polymers, food or pharmaceutical products, viruses, bacteria, cells and other entities.

The term "chemical" is understood, more particularly, in the invention to mean a product chosen from the group constituted by phthalocyanines (substituted at peripheral and/or non-peripheral positions), porphyrins (substituted at meso and/or peripheral (β) positions), dyes and fluorophores (cardiogreen, naphthalocyanine, fluorescein, rhodamine B, oxazine 750 perchlorate, IR 140, IR 676, HITC, 1,1',3,3,3'3'-hexamethylindotricarbocyanine perchlorate, rhodamine 19 perchlorate, diamine green B, propyl astra blue iodide, Nile Blue perchlorate, IR 783, IR 806, oxazine 170 perchlorate).

The present invention relates, very particularly, to the use of a porous silica particle according to the present invention for complexing and trapping metal ions, optionally in the form of salts or colloids, such as gold, silver, copper, strontium, lead, cadmium, chromium, iron and zinc, alkali metal ions, alkaline-earth metal ions, actinide ions and lanthanide ions.

Other features and advantages of the present invention will also appear to a person skilled in the art on reading the examples below given by way of illustration and non-limitingly, with reference to the appended figures.

DETAILED SUMMARY OF PARTICULAR EMBODIMENTS

Figure 1:
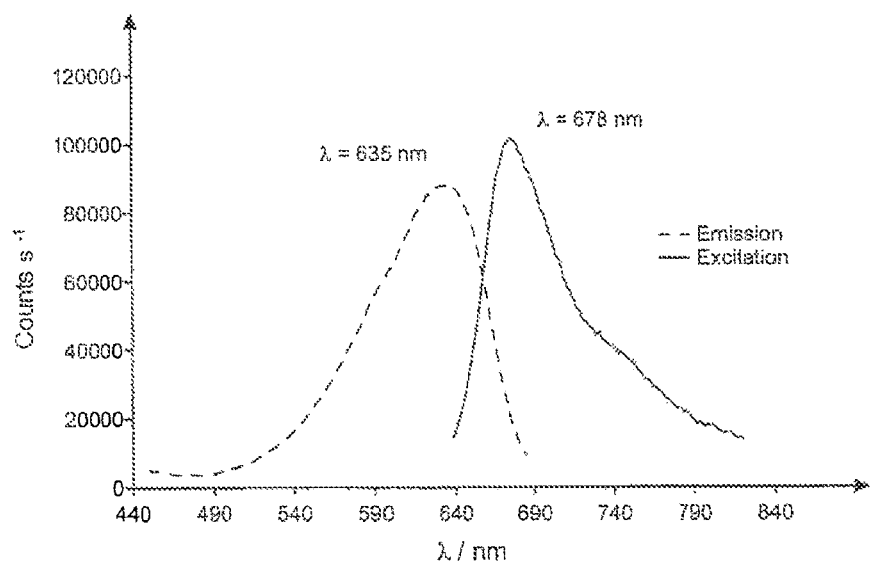
FIG. 1 presents the excitation and emission spectra of the aqueous solution containing silica nanoparticles labelled with Nile Blue A perchlorate and prepared in accordance with the process of the invention.

1. Synthesis of Porous Silica Particles According to the Process of the Invention In the process of this example, hydrophilic β-cyclodextrin is dissolved in water before being injected and uniformly distributed in situ in the reverse microemulsion at ambient temperature prior to the addition of tetraethoxysilane (TEOS, silica precursor). After hydrolysis of the TEOS with aqueous ammonia $NH_4OH$, and various steps of washing the silica particles, the latter (~40 nm in diameter) are dispersed in water and passed by dialysis at low temperature into distilled and deionized water in order to remove the β-cyclodextrin intended to constitute the porosity of these nano-objects.

More particularly, a microemulsion is generated by adding, in this order, the following chemicals: the surfactant Triton X100 (16.8 ml), the cosurfactant n-hexanol (16.4 ml) and the organic solvent cyclohexane (75.04 ml). The solution is then stirred at ambient temperature for 15 minutes.

Next, the pore-forming agent, β-cyclodextrin in aqueous solution, is added (2%, 16 mg in 800 μl of water, M=1135.01 g·mol$^{-1}$) followed by water (4 ml). 25% aqueous ammonia (1000 μl) is injected into this microemulsion. The resulting microemulsion is stirred at ambient temperature for 30 minutes. The silicone derivative TEOS (for "tetraethoxysilane", 900 μl, 40.32×10$^{-4}$ mol, d=0.934, M=208.33 g·mol$^{-1}$) is in turn added. The hydrolysis of the TEOS is initiated by the aqueous ammonia already present and the reaction mixture is stirred for 24 hours at ambient temperature.

The microemulsion is destabilized by the addition of ethanol (200 ml) and the silica beads are washed three times with ethanol and once with water, each washing step being followed by a centrifugal sedimentation step (15 minutes at 6000 rpm).

After the washing step, the removal of the pore-forming agent, the solubility of which in water is of the order of 18 g/l, i.e. approximately 16.5 mM, is achieved by dialysis in water (5 l) with magnetic stirring for one week. The porous silica nanoparticles dispersed in the water (400 ml) are then characterized by analysis using a Zetasizer and by transmission electron microscope (TEM) analysis.

2. Complexing of the Porous Silica Particles Obtained by the Process According to the Invention 2.1. Complexing with the Fluorophore Nile Blue A Perchlorate.

An aqueous solution of porous silica nanoparticles (10 ml) prepared according to the process of the invention is diluted with water (19 ml) and kept under vigorous magnetic stirring.

Next, an aqueous solution of Nile Blue A perchlorate (0.41 mg in 1 ml of water, C=10$^{-3}$ M, M=417.85 g·mol$^{-1}$, n=10$^{-6}$ mol) is added to the reaction mixture which is stirred at ambient temperature for 24 hours. The silica beads complexed with the fluorophore are then washed three times with ethanol and once with water, each washing step being followed by a centrifugal sedimentation step (15 minutes at 6000 rpm).

2.2. Complexing with Fluorophores and Metals.

Table 1 below gives the various fluorophores and metals introduced into the porous silica particles prepared according to the process of the invention.

TABLE 1

| | Molecular weight (g·mol$^{-1}$) | Colours | $\lambda_{max}$/nm (solvent) | Expt. |
|---|---|---|---|---|
| Dyes and fluorophores | | | | |
| NPcSi(OH)$_2$[1] | 774.88 | Dark green | 760 (THF) | 20 |
| Cardiogreen | 774.96 | Green | 777 (water) | 36 |
| Propyl Astra Blue Iodide[2] | 1408.75 | Blue | 336, 614 (water) | 66 |
| Porphyrine[3] | 790.8 | Red | 411 (water) | 67 |
| IR 806 | 735.33 | Green | 802 (water) | 68 |
| Nile Blue A perchlorate | 417.85 | Blue | 638 (water) | 69 |
| IR 140 | 779.21 | Colourless | 827 (water) | 70 |
| HITC[4] | 536.5 | Pale green | 734 (water) | 71 |
| 2-(2-hydroxy-5-methylphenyl)benzotriazole[5] | 225.25 | Colourless | 290 (THF) | 72 |
| Alexa Fluor 680-C$_2$ maleimide[6] | ~1000 | Pale blue | 686 (water) | 39 |
| Metals | | | | |
| PbNO$_3$ | 331.21 | Colourless | — | 35 |
| SrCl$_2$ | 158.53 | Colourless | — | 32 |
| AgNO$_3$ | 169.87 | Colourless | — | 25 + 26 |

[1] Silicon 2,3-naphthalocyanine dihydroxide
[2] Family of phthalocyanines
[3] Meso-tetraphenylporphine-4,4',4'',4'''-tetracarboxylic acid
[4] 1,1',3,3,3',3'-hexamethylindotricarbocyanine iodide
[5] UV absorber
[6] Protein marker 3. Characterizations of the Complexed Silica Particles Obtained: TEM, Zetasizer or Fluorescence Analyses 3.1. Expt. 69 (Table 1).

The silica nanoparticles labelled with Nile Blue A perchlorate prepared in accordance with the process from point 2.1 above and dispersed in water are then characterized by analysis using a Zetasizer, by transmission electron microscope (TEM) analysis and by a fluorescence measurement.

FIG. 1 presents the excitation and emission spectra of the aqueous solution containing these labelled silica nanoparticles.

3.2. Expt. 68 (Table 1.

The spherical and porous nanoparticles prepared according to the process described in point 1 above are complexed with the dye IR 806.

Figure 2:
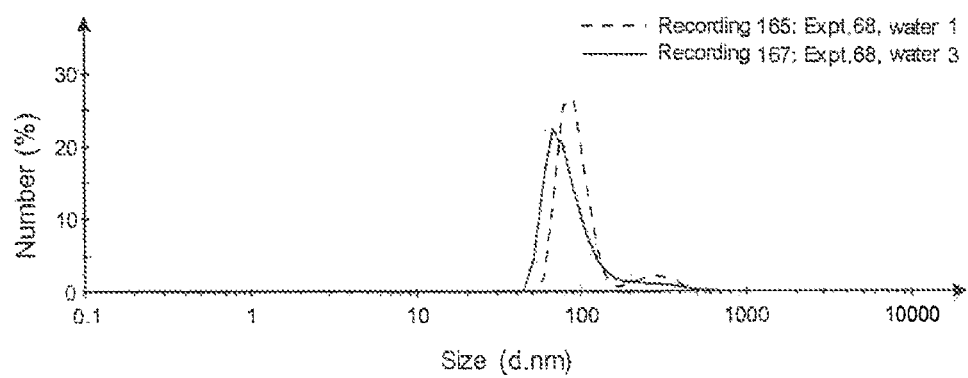
FIG. 2 presents the size distribution obtained for two independent experiments with porous nanoparticles, prepared according to the process of the present invention and complexed with IR 806.

The size of the nanoparticles complexed with the IR 806 and dispersed in water is analysed. FIG. 2 presents the size distribution obtained for two independent tests, the average size measured being respectively 85.24 nm and 68.06 nm.

3.3. Expt. 25 (Table 1).

An aqueous dispersion of silica nanoparticles containing Ag is prepared by using sucrose as a pore-forming agent.

In the process of this example, hydrophilic sucrose is dissolved in water before being injected and uniformly distributed in situ in the reverse microemulsion at ambient temperature prior to the addition of tetraethoxysilane (TEOS, silica precursor). After hydrolysis of the TEOS with ammonia, and various washing steps of the silica particles, the latter (~60 nm in diameter) are dispersed in water and passed by dialysis at low temperature into distilled and deionized water in order to eliminate the sucrose intended to constitute the porosity of these nano-objects.

More particularly, a microemulsion was generated by adding, in this order, the following chemicals: the surfactant Triton X100 (5 ml), the cosurfactant n-hexanol (5 ml) and the organic solvent cyclohexane (20 ml). The solution is then stirred at ambient temperature for 15 minutes.

Next, the pore-forming agent, sucrose in aqueous solution, is added (0.5%, 5 mg in 200 µl of water, M=342.30 g·mol$^{-1}$) followed by water (1 ml). 25% aqueous ammonia (125 ml) is injected into this microemulsion. The resulting microemulsion is stirred at ambient temperature for 30 minutes. The silicone derivative TEOS (for "tetraethoxysilane", 176 µl, 8×10$^{-4}$ mol, d=0.934, M=208.33 g·mol$^{-1}$) is in turn added. The hydrolysis of the TEOS is initiated by the aqueous ammonia already present and the reaction mixture is stirred for 24 hours at ambient temperature. The microemulsion is destabilized by the addition of ethanol (200 ml) and the silica beads are washed three times with ethanol and once with water, each washing step being followed by a centrifugal sedimentation step (15 minutes at 6000 rpm).

After the washing step, the removal of the pore-forming agent, the solubility of which in water is of the order of 22.15 g/l at 20° C., is achieved by dialysis in water (5 l) with magnetic stirring for one week. The porous silica nanoparticles dispersed in the water (500 ml) are then characterized by analysis using a Zetasizer and by transmission electron microscope (TEM) analysis.

Figure 3:
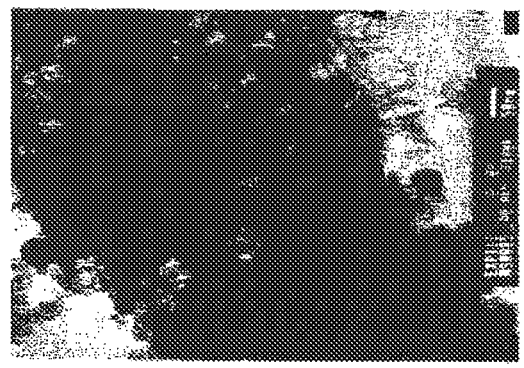
FIG. 3 is a TEM image of an aqueous dispersion of porous silica nanoparticles, prepared according to the process of the invention and complexed with silver (Ag).

The TEM image shows the microstructure of the Expt. 25 sample (FIG. 3). Spherical nanoparticles are observed that are located in an agglomerate and outside of an agglomerate. The size of these nanoparticles lies between 30 and 80 nm.

Figure 4A:
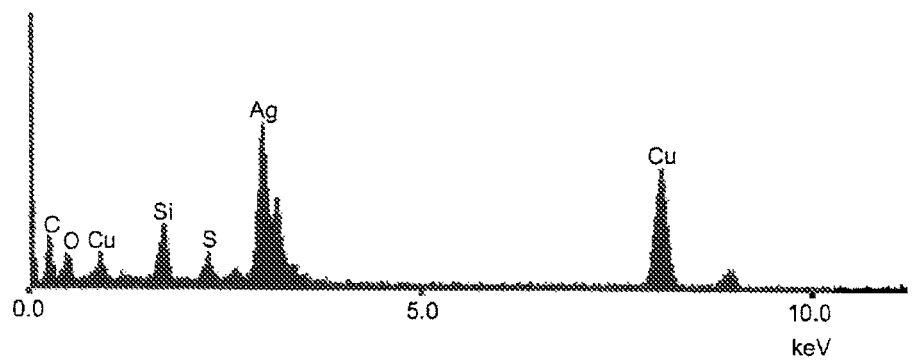
FIG. 4 presents ultimate analyses by energy dispersive X-ray spectroscopy (EDSX) carried out on the spherical nanoparticles of the dispersion presented in FIG. 3, that are present outside of an agglomerate (FIG. 4A) and in an agglomerate (FIG. 4B).

Ultimate analyses by energy dispersive X-ray spectrometry (EDSX) were carried out on these spherical nanoparticles (FIG. 4A). The spherical nanoparticles located outside of an agglomerate are rich in Ag. They also contain Si and S elements. Table 2 below gives the numerical values obtained from the analysis corresponding to FIG. 4A.

TABLE 2

| Elm | CL value | Norm wt % | Prec. | Atomic % | Line |
|---|---|---|---|---|---|
| Si | 1.0000 | 6.41 | 0.98 | 19.62 | K line |
| S | 1.1690 | 3.04 | 0.83 | 8.16 | K line |
| Ag | 4.5206 | 90.55 | 7.16 | 72.22 | L line |

Figure 4B:
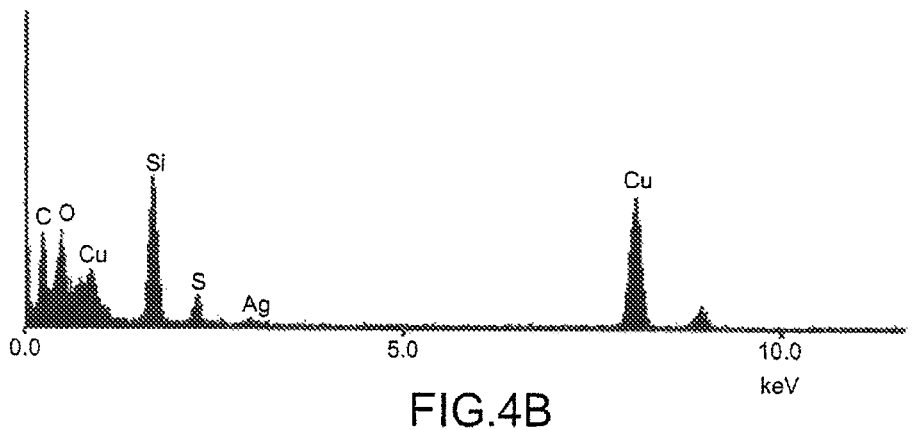

EDSX analyses were also carried out on these agglomerates (FIG. 4B). The latter are rich in Si and contain little Ag. Table 3 below gives the numerical values obtained from the analysis corresponding to FIG. 4B.

TABLE 3

| Elm | CL value | Norm wt % | Prec. | Atomic % | Line |
|---|---|---|---|---|---|
| Si | 1.0000 | 72.12 | 6.56 | 81.57 | K line |
| S | 1.1690 | 14.67 | 3.56 | 14.54 | K line |
| Ag | 4.5206 | 13.21 | 8.19 | 3.89 | L line |

3.4. Expt. 32 (Table 1).

An aqueous dispersion of porous silica nanoparticles that are functionalized with thiol (SH) groups by the addition of 5 to 15% of mercapto-triethoxysilane with the TEOS, containing strontium.

Figure 5:
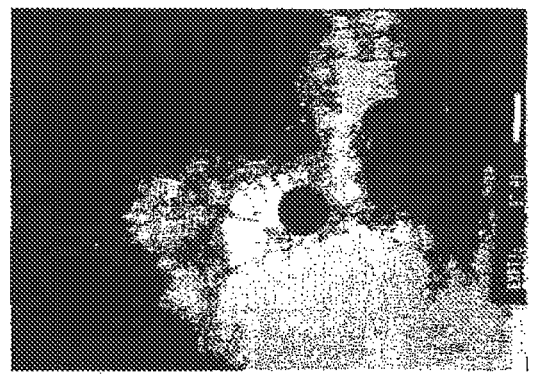
FIG. 5 is a TEM image of an aqueous dispersion of porous silica nanoparticles prepared according to the process of the invention and complexed with strontium (Sr).

The TEM image shows the microstructure of the Expt. 32 sample (FIG. 5). Spherical nanoparticles are observed that are located in an agglomerate and outside of an agglomerate. The size of these nanoparticles is around 100 nm.

Figure 6A:
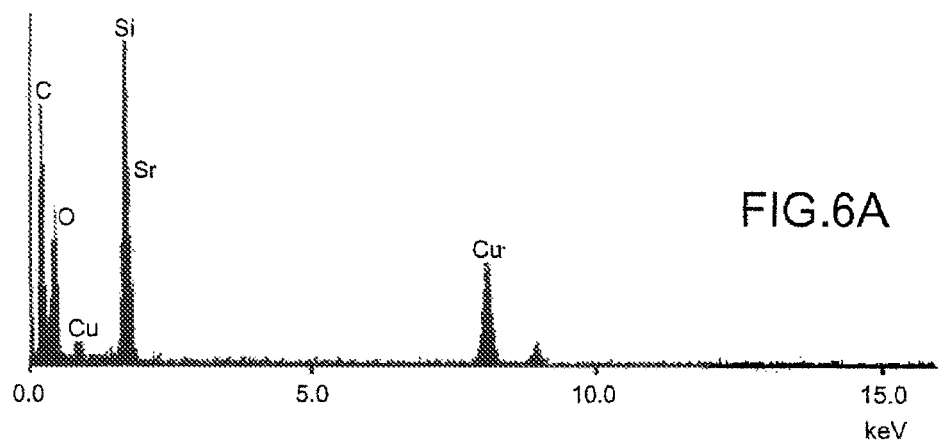
FIG. 6 presents ultimate analyses by energy dispersive X-ray spectroscopy (EDSX) carried out on the spherical nanoparticles of the dispersion presented in FIG. 5, that are present outside an agglomerate (FIG. 6A) and in an agglomerate (FIG. 6B).

Elemental analyses by energy dispersive X-ray spectrometry (EDSX) were carried out on these spherical nanoparticles (FIG. 6A). The spherical nanoparticles located outside of an agglomerate are very rich in the element Si and sometimes contain an Sr element. Table 4 below gives the numerical values obtained from the analysis corresponding to FIG. 6A.

TABLE 4

| Elm | CL value | Norm wt % | Prec. | Atomic % |
|---|---|---|---|---|
| Si | 1.0000 | 92.90 | 9.57 | 97.61 |
| Sr | 4.7693 | 7.10 | 6.00 | 2.39 |

Figure 6B:
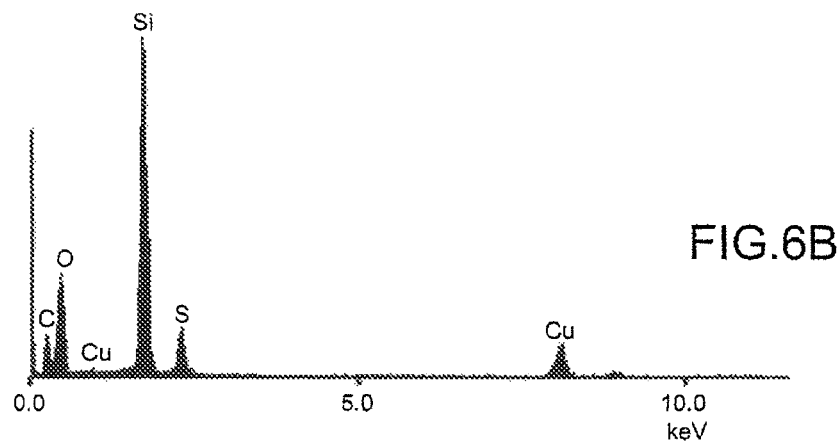

EDSX analyses were also carried out on these agglomerates (FIG. 6B). Compared to the spherical particles, the agglomerate has a high percentage of the element S. Indeed, the thiol functional groups are more concentrated on the nanoscale beads and confer a greater complexation. Table 5 below gives the numerical values obtained from the analysis of FIG. 6B.

TABLE 5

| Elm | CL value | Norm wt % | Prec. | Atomic % |
|---|---|---|---|---|
| Si | 1.0000 | 87.65 | 4.54 | 89.01 |
| Sr | 4.7693 | 0.00 | 0.00 | 0.00 |
| S | 1.1690 | 12.35 | 1.97 | 10.99 |

BIBLIOGRAPHIC REFERENCES

1 Vacassy, R.; Flatt, R. J.; Hofmann, H.; Choi, K. S.; Singh, R. K. *J. of Colloid. and Interface Science*, 2000, 227, 302-315.

2 Yi, D. K.; Lee, S. S.; Papaefthymiou, G. C.; Ying, J. Y. *Chem. Mater.*, 2006, 18, 614-619.

3 Lim, M. H.; Blanford, C. F.; Stein, A. *Chem. Mater.*, 1998, 10, 467-470.

4 Cho, W.; Cha, B.; Kim, J. M.; Char, K. In "The 231$^{st}$ ACS National Meeting", Nano-structured Polymers: Atlanta, Ga., Mar. 26-30, 2006, Poly 214.

5 U.S. Pat. No. 6,632,748 in the name of Samsung Electronics and published on 14 Oct. 2003.
6 Li, S.; Li, Z.; Yan, Y. *Adv. Mater.*, 2003, 15, 1528-1531.
7 Kwon, M. J.; Bae, J. H.; Kim, J. J.; Na, K.; Lee, E. S. *International Journal of Pharmaceutics*, 2007, 333, 5-9.
8 Sabadini, E.; Cosgrove, T.; do Carmo Egidio, F. Carbohydr. Res., 2006, 341, 270-274.
9 U.S. Pat. No. 5,760,017 in the name of the Commissariat à l'Energie Atomique and published on 2 Jun. 1998.

The invention claimed is:

1. A process for preparing a porous silica particle comprising:
    preparing a silica particle comprising a water-soluble pore-forming agent; and
    removing said pore-forming agent by dissolution,
    wherein said silica particle comprising a water-soluble pore-forming agent is prepared from a reverse microemulsion, and
    wherein said water-soluble pore-forming agent is chosen from the group consisting of cyclodextrins, cyclodextrin derivatives, monosaccharides, oligosaccharides and polysaccharides.

2. The process according to claim 1, further comprising:
    a) preparing a water-in-oil microemulsion (Ma) containing said water-soluble pore-forming agent;
    b) adding, to the microemulsion (Ma) prepared in step a), a compound that enables the hydrolysis of a silane-based compound;
    c) adding, to the microemulsion (Mb) obtained in step b), at least one silane-based compound;
    d) adding, to the microemulsion (Mc) obtained in step c), a solvent that makes it possible to destabilize said microemulsion;
    e) recovering silica particles comprising a pore-forming agent which are precipitated during step d); and
    f) removing, by dissolution, the water-soluble pore-forming agent from the silica particles recovered during step e) to obtain porous silica particles.

3. The process according to claim 2, wherein said step a) comprises preparing a first microemulsion (M1) into which the water-soluble pore-forming agent is subsequently incorporated.

4. The process according to claim 3, wherein said microemulsion (M1) is obtained by mixing together at least one surfactant, at least one cosurfactant, and at least one non-polar or weakly polar solvent.

5. The process according to claim 3, wherein a polar solvent is added to the microemulsion after the incorporation of said water-soluble pore-forming agent into the microemulsion (M1).

6. The process according to claim 2, wherein each said at least one silane-based compound is of general formula:

$$SiR1R2R3R4,$$

in which R1, R2, R3 and R4 are, independently of one another, a hydrogen; a halogen; an amine group; an amide group; an acyl group; a vinyl group; a hydroxyl group; an epoxy group; an isocyanate group; a carboxyl group; a thiol or mercapto group; an acryloxy group such as a methacryloxy group; an optionally substituted, linear or branched, alkyl group having 1 to 12 carbon atoms; an optionally substituted, linear or branched, aryl group having 4 to 15 carbon atoms or an alkoxy group of formula -OR6 with R6 representing an optionally substituted, linear or branched, alkyl group having 1 to 12 carbon atoms.

7. The process according to claim 2, wherein said compound that enables the hydrolysis of the silane-based compound is a compound chosen from the group consisting of ammonia, potassium hydroxide (KOH), lithium hydroxide (LiOH) and sodium hydroxide (NaOH).

8. The process according to claim 2, wherein the solvent that makes it possible to destabilize the microemulsion (Mc) is a polar solvent ethanol, acetone or THF.

* * * * *